United States Patent
Kinoshita et al.

(10) Patent No.: US 11,479,503 B2
(45) Date of Patent: Oct. 25, 2022

(54) CHEMICALLY STRENGTHENED GLASS AND METHOD FOR MANUFACTURING CHEMICALLY STRENGTHENED GLASS

(71) Applicant: NIPPON ELECTRIC GLASS CO., LTD., Shiga (JP)

(72) Inventors: Kiyotaka Kinoshita, Shiga (JP); Hiroshi Sasaki, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 317 days.

(21) Appl. No.: 16/632,570

(22) PCT Filed: Jul. 19, 2018

(86) PCT No.: PCT/JP2018/027098
§ 371 (c)(1),
(2) Date: Jan. 21, 2020

(87) PCT Pub. No.: WO2019/021930
PCT Pub. Date: Jan. 31, 2019

(65) Prior Publication Data
US 2020/0156993 A1    May 21, 2020

(30) Foreign Application Priority Data
Jul. 24, 2017  (JP) .............................. JP2017-142392

(51) Int. Cl.
*B32B 15/04* (2006.01)
*B32B 17/06* (2006.01)
(Continued)

(52) U.S. Cl.
CPC ............ *C03C 21/002* (2013.01); *B32B 17/06* (2013.01); *C03C 3/083* (2013.01); *B32B 2250/03* (2013.01);
(Continued)

(58) Field of Classification Search
CPC .................................................... C03C 21/002
(Continued)

(56) References Cited

U.S. PATENT DOCUMENTS 10,968,136 B2 * 4/2021 Fukada ................. C03C 21/002
2014/0370264 A1 12/2014 Ohara et al.
(Continued)

FOREIGN PATENT DOCUMENTS

JP    2016-44119    4/2016
JP    2017-100929   6/2017
(Continued)

OTHER PUBLICATIONS

JP2016044119 English machine translation, 2016.*
(Continued)

*Primary Examiner* — Lauren R Colgan
(74) *Attorney, Agent, or Firm* — Wenderoth, Lind & Ponack, L.L.P.

(57) ABSTRACT

Provided is a tempered glass sheet, including: a compressive stress layer having a compressive stress of 20 MPa or more continuously from a main surface in a depth direction thereof; a tensile stress layer that is arranged on an inner side with respect to the compressive stress layer in a sheet thickness direction and has a tensile stress of 20 MPa or more continuously in a depth direction thereof; and a stress-neutral layer arranged between the compressive stress layer and the tensile stress layer, wherein the stress-neutral layer has a compressive stress of less than 20 MPa and/or a tensile stress of less than 20 MPa continuously in the sheet thickness direction, and has a thickness of 5.3% or more of a sheet thickness.

15 Claims, 5 Drawing Sheets

(51) Int. Cl.
*C03C 21/00* (2006.01)
*C03C 3/083* (2006.01)

(52) U.S. Cl.
CPC ..... *B32B 2457/208* (2013.01); *B32B 2559/00* (2013.01)

(58) Field of Classification Search
USPC ................................................ 428/410, 426
See application file for complete search history.

(56) References Cited

U.S. PATENT DOCUMENTS

| | | |
|---|---|---|
| 2016/0122239 A1 | 5/2016 | Amin et al. |
| 2016/0122240 A1* | 5/2016 | Oram ..................... C03C 3/097 501/63 |
| 2017/0217824 A1 | 8/2017 | Ohara et al. |
| 2018/0037498 A1 | 2/2018 | Ohara et al. |
| 2018/0044232 A1 | 2/2018 | Ohara et al. |
| 2018/0346376 A1 | 12/2018 | Fukada et al. |

FOREIGN PATENT DOCUMENTS

| | | | |
|---|---|---|---|
| WO | 2013/088856 | | 6/2013 |
| WO | WO2007094329 | * | 6/2017 |

OTHER PUBLICATIONS

International Preliminary Report on Patentability dated Jan. 28, 2020 in International (PCT) Application No. PCT/JP2018/027098.
International Search Report (ISR) dated Oct. 23, 2018 in International (PCT) Application No. PCT/JP2018/027098.

* cited by examiner

CHEMICALLY STRENGTHENED GLASS AND METHOD FOR MANUFACTURING CHEMICALLY STRENGTHENED GLASS

TECHNICAL FIELD

The present invention relates to a tempered glass and a method of producing the same, and more particularly, to a tempered glass suitable for a cover glass for a cellular phone, a digital camera, a personal digital assistant (PDA), or a touch panel display, and a method of producing the same.

BACKGROUND ART

Devices such as a cellular phone (in particular a smartphone), a digital camera, a PDA, a touch panel display, a large-screen television, and contact-less power transfer show a tendency of further prevalence. In those applications, a tempered glass obtained through ion exchange treatment has been used. In addition, in recent years, the use of the tempered glass in exterior components of a digital signage, a mouse, a smartphone, and the like is increasing.

A chemically tempered glass includes, on its surface, a compressive stress layer formed by ion exchange treatment. Accordingly, the formation and extension of a crack in the surface are suppressed, and hence high strength is obtained. The strength of the tempered glass is considered to be capable of being improved by adjusting the formation mode of such compressive stress layer (e.g., Patent Literature 1).

CITATION LIST

Patent Literature 1: WO 2013/088856 A1

SUMMARY OF INVENTION

Technical Problem

However, the tempered glass has still room for improvement in terms of the achievement of higher impact resistance.

The present invention has been made in view of the above-mentioned circumstances, and an object of the present invention is to provide a chemically tempered glass having impact resistance higher than that of the related art.

Solution to Problem

According to one embodiment of the present invention, there is provided a chemically tempered glass sheet, comprising: a compressive stress layer having a compressive stress of 20 MPa or more continuously from a main surface in a depth direction thereof; a tensile stress layer that is arranged on an inner side with respect to the compressive stress layer in a sheet thickness direction and has a tensile stress of 20 MPa or more continuously in a depth direction thereof; and a stress-neutral layer arranged between the compressive stress layer and the tensile stress layer, wherein the stress-neutral layer has a compressive stress of less than 20 MPa and/or a tensile stress of less than 20 MPa continuously in the sheet thickness direction, and has a thickness of 5.3% or more of a sheet thickness.

In the chemically tempered glass according to the one embodiment of the present invention, it is preferred that the stress-neutral layer further comprise a neutral core layer that continuously has a compressive stress 0.01 or less times as large as a maximum compressive stress value of the compressive stress layer and/or a tensile stress 0.1 or less times as large as a maximum tensile stress value of the tensile stress layer, and that has a thickness of 2.5% or more of the sheet thickness.

In the chemically tempered glass according to the one embodiment of the present invention, it is preferred that the thickness of the stress-neutral layer be 25% or less of the sheet thickness.

In the chemically tempered glass according to the one embodiment of the present invention, it is preferred that the stress-neutral layer extend from a position equal to or shallower than 8% of the sheet thickness toward a center of the sheet thickness.

In the chemically tempered glass according to the one embodiment of the present invention, it is preferred that the tensile stress layer extend from a position equal to or deeper than 19% of the sheet thickness with respect to the main surface toward a region including a central portion of the sheet thickness.

In the chemically tempered glass according to the one embodiment of the present invention, it is preferred that the chemically tempered glass have a thickness of 1.0 mm or less, the compressive stress layer have a maximum compressive stress of 600 MPa or more, and the tensile stress layer have a maximum tensile stress of from 20 MPa to 72 MPa.

In the chemically tempered glass according to the one embodiment of the present invention, it is preferred that the stress-neutral layer have a compressive stress of from 0 MPa to 20 MPa continuously over a thickness of 3% or more of a sheet thickness T.

In the chemically tempered glass according to the one embodiment of the present invention, it is preferred that the stress-neutral layer comprise a low-compressive stress layer having a compressive stress, and a low-tensile stress layer having a tensile stress, and the low-compressive stress layer and the low-tensile stress layer be alternately formed.

In the chemically tempered glass according to the one embodiment of the present invention, it is preferred that, when a stress change amount per unit depth in a case where a stress change in the compressive stress layer in the depth direction is linearly approximated by using a least-squares method is represented by A1 (MPa/$\mu$m), and a stress change amount per unit depth in a case where a stress change in the stress-neutral layer in a depth direction thereof is linearly approximated by using the least-squares method is represented by A2 (MPa/$\mu$m), a relationship of A1/A2>210 be satisfied.

In the chemically tempered glass according to the one embodiment of the present invention, it is preferred that, when a position in the depth direction between the compressive stress layer and the tensile stress layer at which a stress becomes zero is represented by DOL_zero, and a stress change amount per unit depth in a case where a tensile stress change from the position DOL_zero to a depth of DOL_zero+15 ($\mu$m) is linearly approximated by using a least-squares method is represented by B, a relationship of B$\geq$−0.90 be satisfied.

It is preferred that the chemically tempered glass according to the one embodiment of the present invention comprise the compressive stress layer and the stress-neutral layer on each side of front and back main surfaces thereof.

It is preferred that the chemically tempered glass according to the one embodiment of the present invention comprise as a glass composition, in terms of mol %, 50% to 80% of $SiO_2$, 5% to 30% of $Al_2O_3$, 5% to 25% of $Na_2O$, 0% to 10% of $Li_2O$, and 0% to 30% of MgO.

It is preferred that the chemically tempered glass according to the one embodiment of the present invention further comprise as a glass composition, in terms of mol %, 0.01% to 10% of $P_2O_5$ and 0.01% to 3% of $SnO_2$.

According to one embodiment of the present invention, there is provided a method of producing a chemically tempered glass, comprising: immersing a glass to be tempered containing an alkali metal as a composition in a first molten salt to subject the glass to first ion exchange treatment; and then immersing the glass in a second molten salt to subject the glass to second ion exchange treatment to provide the chemically tempered glass, wherein the first molten salt comprises a molten salt containing 18,500 ppm or more of a desorbed ion desorbed from the glass in the first ion exchange treatment, wherein a concentration of the desorbed ion in the second molten salt is less than a concentration of the desorbed ion in the first molten salt, and wherein a treatment time of the first ion exchange treatment is 3 or more times as long as a treatment time of the second ion exchange treatment.

In the method of producing a chemically tempered glass according to the one embodiment of the present invention, it is preferred that the desorbed ion comprise a sodium ion, and the concentration of the desorbed ion in the second molten salt be less than 1,000 ppm.

Advantageous Effects of Invention

According to the present invention, the chemically tempered glass having impact resistance higher than that of the related art is obtained.

DESCRIPTION OF EMBODIMENTS

A chemically tempered glass according to an embodiment of the present invention is described below.

A chemically tempered glass 1 according to the embodiment of the present invention is a sheet-shaped glass chemically tempered by ion exchange. A thickness T of the chemically tempered glass 1, which may be arbitrarily set, is, for example, 2.0 mm or less, preferably 1.0 mm or less, more preferably from 0.1 mm to 0.9 mm, still more preferably from 0.3 mm to 0.6 mm.

Figure 1:
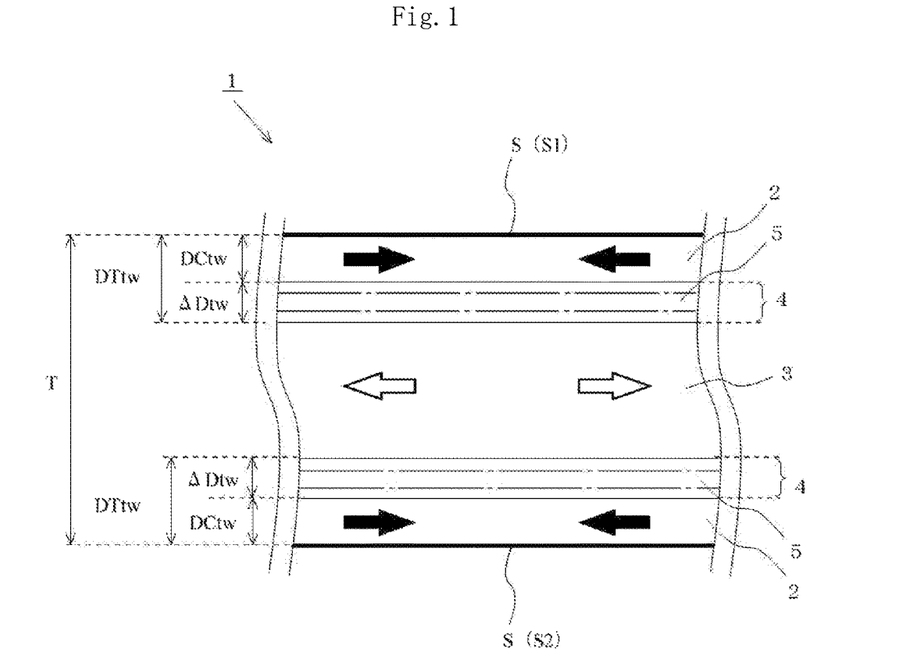
FIG. 1 is a view for illustrating the outline of a partial section of a chemically tempered glass according to an embodiment of the present invention.

As illustrated in FIG. 1, the chemically tempered glass 1 comprises compressive stress layers 2, a tensile stress layer 3, and stress-neutral layers 4. FIG. 1 is a schematic sectional view for illustrating the arrangement of the stress layers in the chemically tempered glass 1 according to the embodiment of the present invention. The tensile stress layer 3 is formed in a central portion in a sheet thickness direction, that is, at a position deeper than that of the compressive stress layer 2. The stress-neutral layer 4 is formed between the compressive stress layer 2 and the tensile stress layer 3.

Figure 2:
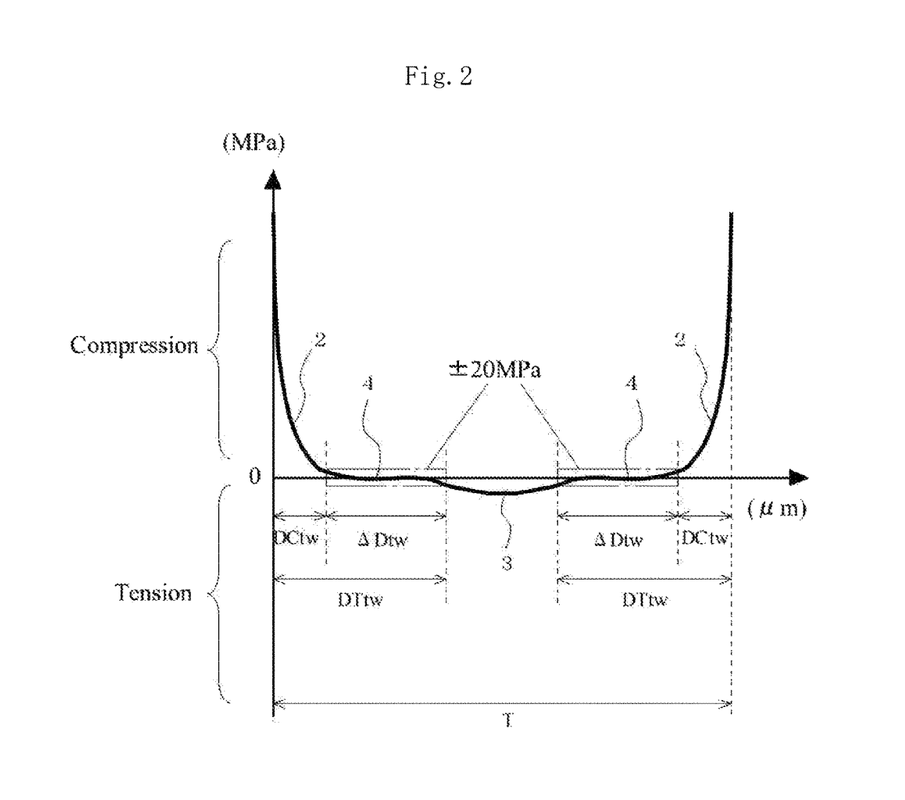
FIG. 2 is a graphical representation for showing an example of the stress distribution of the chemically tempered glass according to the embodiment of the present invention in its thickness direction.

The stress distribution of each stress layer is, for example, as shown in FIG. 2. In the graph of FIG. 2, an axis of ordinate indicates a stress and an axis of abscissa indicates a position (depth) in the thickness direction with respect to one main surface. In the graph of FIG. 2, a stress of a positive value represents a compressive stress, and a stress of a negative value represents a tensile stress. That is, it is shown that, as the absolute value of a stress in the graph of FIG. 2 becomes larger, the stress becomes larger.

The compressive stress layer 2 is a layer that is formed along a main surface S (S1, S2), and has a compressive stress of 20 MPa or more continuously from the main surface S in its depth direction. A maximum compressive stress MaxCS in the compressive stress layer 2 is preferably 600 MPa or more, more preferably 800 MPa or more, still more preferably from 1,000 MPa to 1,700 MPa. The compressive stress in the compressive stress layer 2 becomes maximum, for example, near the main surface S, and gradually reduces in the depth direction. The compressive stress layer 2 may have a plurality of compressive stress peaks in the sheet thickness direction.

The tensile stress layer 3 is a layer having a tensile stress of 20 MPa or more continuously in its depth direction. A maximum tensile stress MaxCT in the tensile stress layer 3 is, for example, 20 MPa or more, preferably from 20 MPa to 72 MPa, more preferably from 20 MPa to 50 MPa. The tensile stress layer 3 is formed in a region including a central portion C in the sheet thickness direction. The tensile stress of the tensile stress layer 3 becomes maximum near the central portion C, and gradually reduces toward the main surface S.

The stress-neural layer 4 is a layer that has a stress smaller than those of the compressive stress layer 2 and the tensile stress layer 3, and that is formed over a predetermined thickness (depth). Specifically, the stress-neutral layer 4 is a layer that has a compressive stress of less than 20 MPa and/or a tensile stress of less than 20 MPa continuously in the sheet thickness direction, and that has a thickness of 5.3% or more of the sheet thickness T. Therefore, when the thickness of a layer having a compressive stress of less than 20 MPa and/or a tensile stress of less than 20 MPa is represented by $\Delta Dtw$, the stress-neutral layer 4 satisfies the following formula (1).

$$T \times 0.053 \leq \Delta Dtw \tag{1}$$

The $\Delta Dtw$ of the stress-neutral layer 4 falls within the range of preferably 6% or more of the sheet thickness, more preferably from 7% to 25% of the sheet thickness, still more preferably from 8% to 25% of the sheet thickness.

In addition, the stress-neutral layer 4 preferably extends from a position equal to or shallower than 8% (main surface S side) of the sheet thickness T with respect to the main surface S toward the central portion C up to the tensile stress layer 3. That is, a depth DCtw from the main surface S to an end portion on the surface side of the stress-neutral layer 4 (position at which the compressive stress becomes 20 MPa) preferably satisfies the following formula (2). In this embodiment, the DCtw is substantially equal to the depth of the compressive stress layer 2.

$$DCtw \leq T \times 0.08 \quad (2)$$

Figure 3:
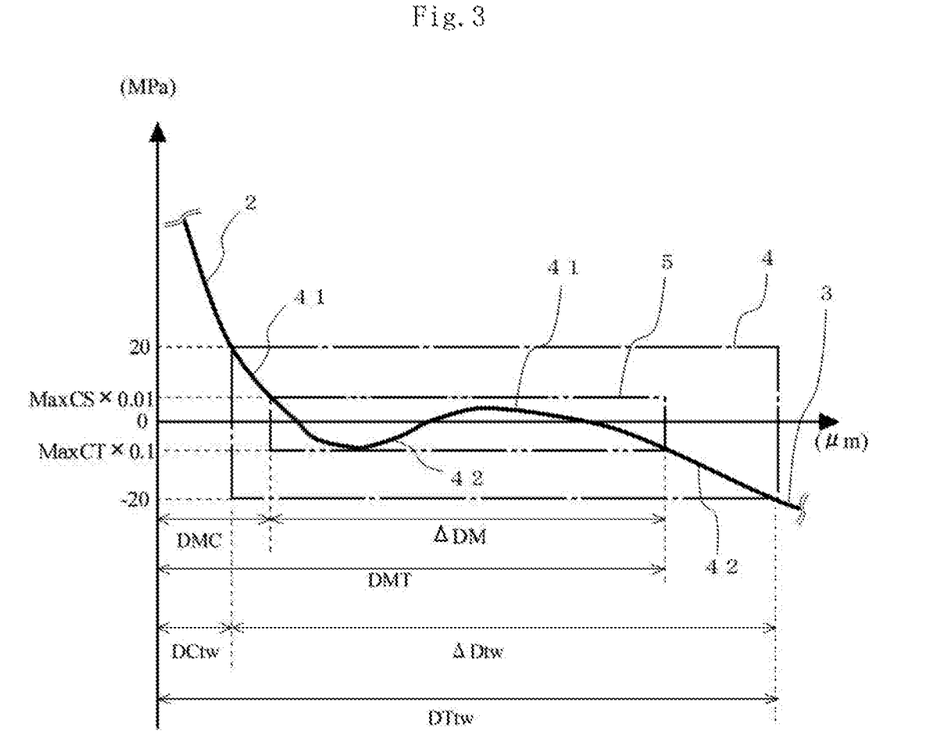
FIG. 3 is a partially enlarged graph of the stress distribution of the chemically tempered glass according to the embodiment of the present invention in the thickness direction.
Figure 4:
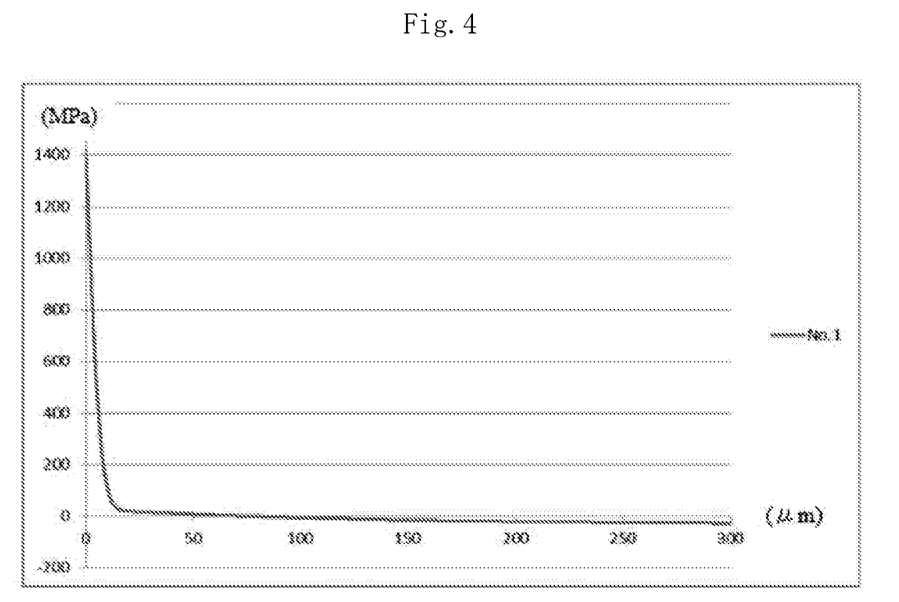
FIG. 4 is a graphical representation for showing the stress distribution of a chemically tempered glass according to Example No. 1 of the present invention.
Figure 5:
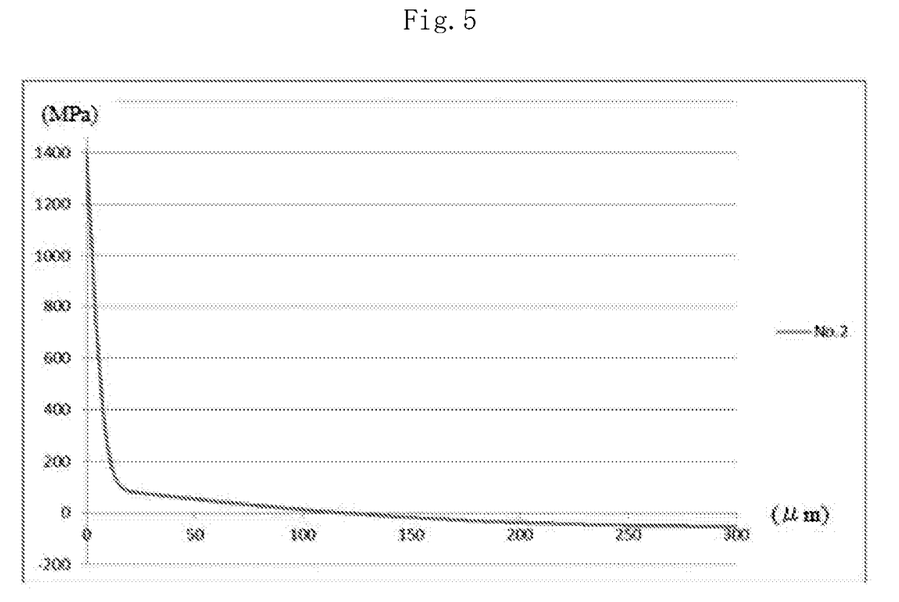
FIG. 5 is a graphical representation for showing the stress distribution of a chemically tempered glass according to Example No. 2 of the present invention.
Figure 6:
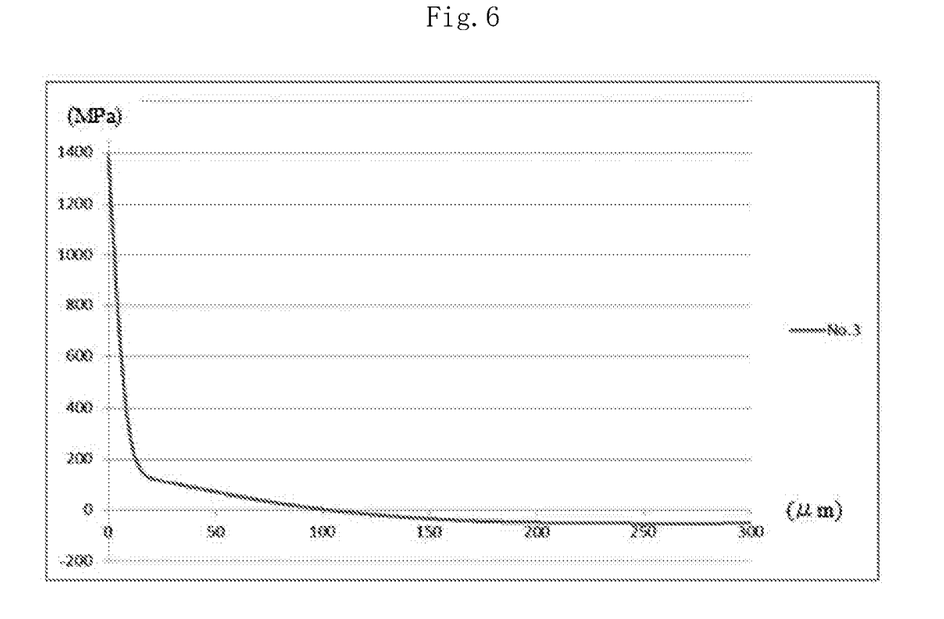
FIG. 6 is a graphical representation for showing the stress distribution of a chemically tempered glass according to Example No. 3 of the present invention.
Figure 7:
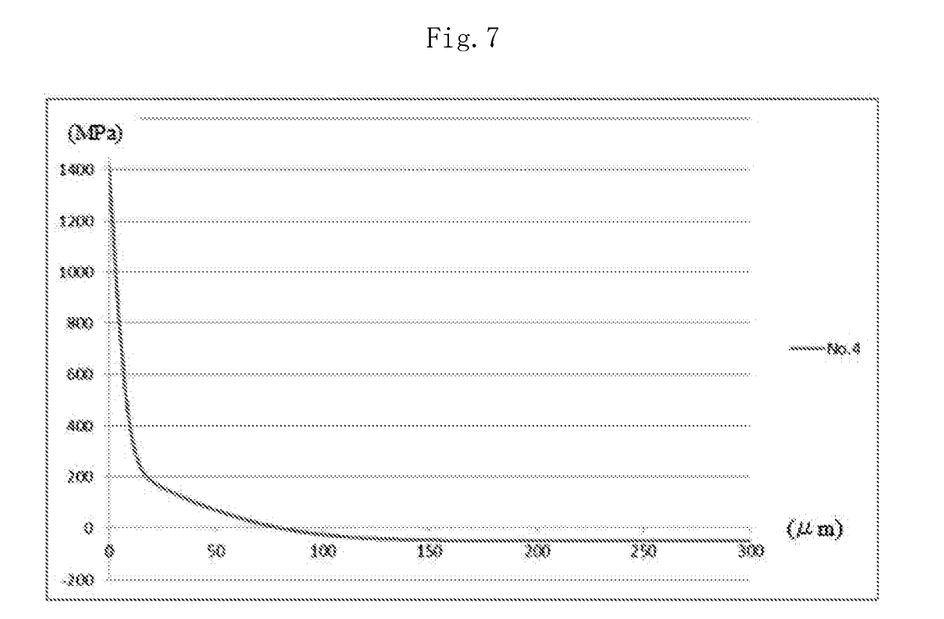
FIG. 7 is a graphical representation for showing the stress distribution of a chemically tempered glass according to Example No. 4 of the present invention.
Figure 8:
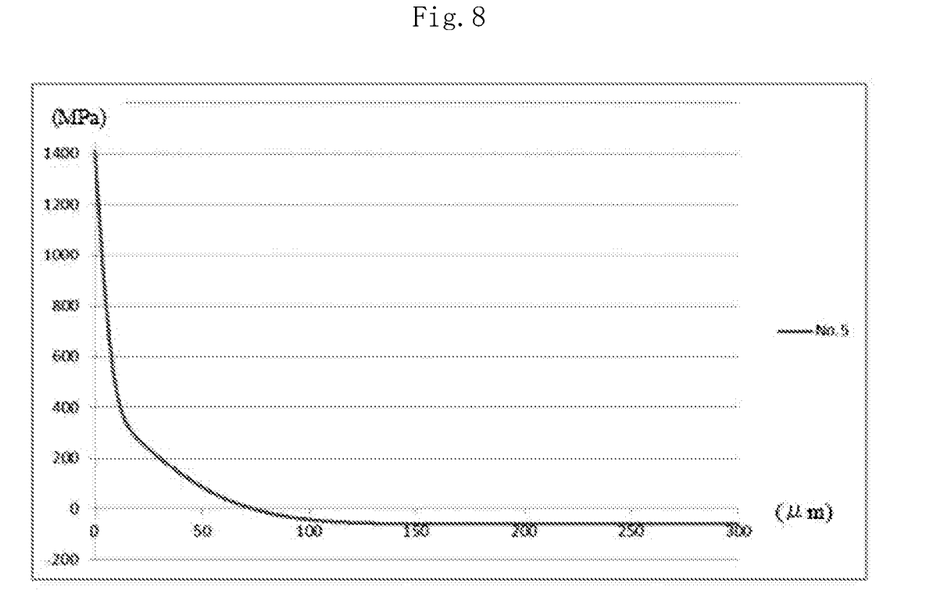
FIG. 8 is a graphical representation for showing the stress distribution of a chemically tempered glass according to Example No. 5 of the present invention.
Figure 9:
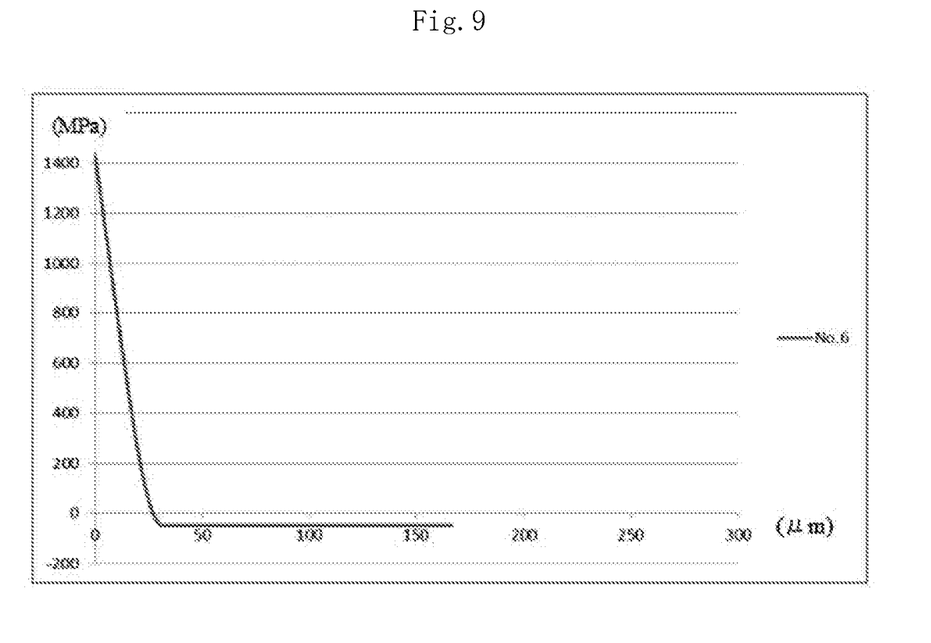
FIG. 9 is a graphical representation for showing the stress distribution of a chemically tempered glass according to Example No. 6 of the present invention.

Further, the stress-neutral layer 4 preferably comprises a neutral core layer 5 having an even smaller stress and having a thickness equal to or more than a predetermined value. FIG. 3 is a partially enlarged graph for showing the stress distributions of the stress-neutral layer 4 and the vicinity of the neutral core layer 5 in an enlarged manner. In the graph of FIG. 3, an axis of ordinate indicates a stress and an axis of abscissa indicates a position (depth) in the thickness direction with respect to one main surface.

Specifically, the neutral core layer 5 is a layer that has a compressive stress 0.01 or less times as large as the maximum compressive stress value of the compressive stress layer and/or a tensile stress 0.1 or less times as large as the maximum tensile stress value of the tensile stress layer continuously in the sheet thickness direction, and that has a thickness of 2.5% or more of the sheet thickness T. When the thickness of a layer continuously having a compressive stress 0.01 or less times as large as the maximum compressive stress value of the compressive stress layer 2 and/or a tensile stress 0.1 or less times as large as the maximum tensile stress value of the tensile stress layer 3 is represented by ΔDM, the ΔDM in the neutral core layer 5 satisfies the following formula (3).

$$\Delta DM \geq T \times 0.025 \quad (3)$$

The thickness ΔDM of the neutral core layer 5 falls within the range of preferably 5% or more of the sheet thickness, more preferably from 8% to 25% of the sheet thickness.

In the stress-neutral layer 4, when a layer having a compressive stress is defined as a low-compressive stress layer 41, and a layer having a tensile stress is defined as a low-tensile stress layer 42, the low-compressive stress layer 41 and the low-tensile stress layer 42 may be alternately arranged in the sheet thickness direction as shown in FIG. 3. The low-compressive stress layer may be positioned between the plurality of low-tensile stress layers, or the low-tensile stress layer may be positioned between the plurality of low-compressive stress layers.

The stress-neutral layer 4 may comprise the low-compressive stress layer 41 over a relatively long range. Specifically, the stress-neutral layer 4 may have a compressive stress of from 0 MPa to 20 MPa continuously over a thickness of 3% or more of the sheet thickness T.

When a stress change amount per unit depth in the compressive stress layer 2 determined by using a least-squares method is represented by A1 (MPa/μm), and a stress change amount per unit depth in the stress-neutral layer 4 determined by using a least-squares method is represented by A2 (MPa/μm), a ratio A1/A2 is preferably 200 or more, more preferably 300 or more or 400 or more. The stress change amounts A1 and A2 per unit depth may each be determined, for example, as follows: in a graph for showing a stress and a stress change in a depth direction like FIG. 2, the portion of the corresponding layer is linearly approximated by using the least-squares method, and the slope of the resultant straight line is adopted as the change amount.

In addition, in the chemically tempered glass 1, when a position in the depth direction between the compressive stress layer 2 and the tensile stress layer at which a stress becomes zero is represented by DOL_zero, and a stress change amount per unit depth in the case where a tensile stress change from the position DOL_zero to a depth of DOL_zero+15 (μm) (i.e., a position deeper toward the center of the sheet thickness of the glass by 15 μm with respect to the DOL_zero) is linearly approximated by using the least-squares method is represented by B, a relationship of B≥−0.90 is preferably satisfied. That is, the tensile stress change amount is preferably gradual near a region in which the stress is transformed from the compressive stress to the tensile stress. With such configuration, the breakage resistance of the chemically tempered glass 1 can be further improved. The stress change amount B more preferably satisfies a relationship of B≥−0.50, still more preferably satisfies a relationship of B≥−0.40, and still further more preferably satisfies a relationship of B≥−0.30.

Values measured with, for example, FSM-6000LE and FsmV manufactured by Orihara Manufacturing Co., Ltd. may be used as the stress of the chemically tempered glass 1 and its distribution.

The chemically tempered glass 1 of the present invention may be produced by, for example, the following procedure. First, a glass that contains an alkali metal oxide as a composition and is to be subjected to tempering treatment (hereinafter referred to as "glass to be tempered") is prepared. Next, a first molten salt is caused to adhere to the surface of the glass to be tempered to perform ion exchange treatment (first tempering step). After that, a second molten salt having a $KNO_3$ concentration higher than that of the first molten salt is caused to adhere to the surface of the glass to perform ion exchange (second tempering step).

For example, the glass to be tempered preferably comprises as a glass composition, in terms of mol %, 50% to 80% of $SiO_2$, 5% to 30% of $Al_2O_3$, 5% to 25% of $Na_2O$, 0% to 10% of $Li_2O$, and 0% to 30% of MgO. Described below are reasons why the content ranges of the respective components are restricted as described above. In the description of the content range of each component, the expression "%" means "mol %" unless otherwise specified.

$SiO_2$ is a component that forms a glass network, and the content of $SiO_2$ is preferably from 50% to 80%, from 55% to 77%, from 57% to 75%, from 58% to 74%, or from 60% to 73%, particularly preferably from 62% to 72%. When the content of $SiO_2$ is too small, vitrification does not occur easily, the thermal expansion coefficient of the glass becomes too high, and thermal shock resistance is liable to lower. Meanwhile, when the content of $SiO_2$ is too large, meltability and formability are liable to lower, and the thermal expansion coefficient becomes too low, with the result that it becomes difficult to match the thermal expansion coefficient with those of peripheral materials in use as, for example, a component of an electronic product.

$Al_2O_3$ is a component that enhances ion exchange performance, and is also a component that increases a strain point and a Young's modulus. The content of $Al_2O_3$ is preferably from 5% to 30%. When the content of $Al_2O_3$ is too small, the ion exchange performance may not be exhibited sufficiently. Thus, a suitable lower limit range of the content of $Al_2O_3$ is 5.5% or more, 6.5% or more, 8% or more, 9% or more, 10% or more, particularly 11% or more. Meanwhile, when the content of $Al_2O_3$ is too large, devitrified crystals are liable to be deposited in the glass, and it becomes difficult to form a glass sheet by an overflow down-draw method or the like. In particular, when the glass sheet is formed by the overflow down-draw method through the use of an alumina forming body, a devitrified crystal of spinel is liable to be deposited at an interface between the glass and the alumina forming body. In addition, the thermal expansion coefficient of the glass becomes too low, and hence it becomes difficult to match the thermal expansion coefficient with those of peripheral materials. In addition, acid resistance reduces and hence it becomes difficult to apply the glass to an acid treatment step. In particular, in a system in which a touch sensor is formed in a cover glass, the glass sheet is simultaneously subjected to chemical treatment. In this case, when the acid resistance is low, a problem is liable to occur in the step of etching a film made of ITO or the like. In addition, viscosity at high temperature increases, which is liable to lower the meltability. Thus, a suitable upper limit range of the content of $Al_2O_3$ is 25% or less, 20% or less, 18% or less, 16% or less, 15% or less, 14% or less, 13% or less, 12.5% or less, particularly 12% or less.

$Na_2O$ is an ion exchange component, and is also a component that lowers the viscosity at high temperature to increase the meltability and formability. In addition, $Na_2O$ is also a component that improves devitrification resistance. When the content of $Na_2O$ is too small, the meltability lowers, the thermal expansion coefficient lowers, and the ion exchange performance is liable to lower. Thus, a suitable lower limit range of the content of $Na_2O$ is 5% or more, 7% or more, more than 7.0%, 8% or more, particularly 9% or more. Meanwhile, when the content of $Na_2O$ is too large, there is a tendency that the thermal expansion coefficient becomes too high, with the result that the thermal shock resistance lowers, it becomes difficult to match the thermal expansion coefficient with those of peripheral materials, and a density increases. In addition, the strain point lowers excessively, and the glass composition loses its component balance, with the result that the devitrification resistance lowers contrarily in some cases. Thus, a suitable upper limit range of the content of $Na_2O$ is 25% or less, 23% or less, 21% or less, 19% or less, 18.5% or less, 17.5% or less, 17% or less, 16% or less, 15.5% or less, 14% or less, 13.5% or less, particularly 13% or less.

For example, the following components other than the above-mentioned components may be added.

The content of $B_2O_3$ is preferably from 0% to 15%. $B_2O_3$ is a component that lowers the viscosity at high temperature and the density, stabilizes the glass to make it difficult for a crystal to deposit, and lowers a liquidus temperature. In addition, $B_2O_3$ is a component that enhances crack resistance to enhance scratch resistance. Thus, a suitable lower limit range of the content of $B_2O_3$ is 0.01% or more, 0.1% or more, 0.5% or more, 0.7% or more, 1% or more, 2% or more, particularly 3% or more. However, when the content of $B_2O_3$ is too large, coloring on the surface of the glass called weathering may occur through ion exchange, water resistance may lower, and a depth of layer is liable to decrease. Thus, a suitable upper limit range of the content of $B_2O_3$ is 14% or less, 13% or less, 12% or less, 11% or less, less than 10.5%, 10% or less, 9% or less, 8% or less, 7% or less, 6% or less, particularly 4.9% or less.

A molar ratio $B_2O_3/Al_2O_3$ is preferably from 0 to 1, from 0.1 to 0.6, from 0.12 to 0.5, from 0.142 to 0.37, from 0.15 to 0.35, or from 0.18 to 0.32, particularly preferably from 0.2 to 0.3. This allows both the devitrification resistance and the ion exchange performance to be achieved at high levels while the viscosity at high temperature is optimized. The term "molar ratio $B_2O_3/Al_2O_3$" refers to a value obtained by dividing the content of $B_2O_3$ by the content of $Al_2O_3$.

A molar ratio $B_2O_3/(Na_2O+Al_2O_3)$ is preferably from 0 to 1, from 0.01 to 0.5, from 0.02 to 0.4, from 0.03 to 0.3, from 0.03 to 0.2, from 0.04 to 0.18, from 0.05 to 0.17, or from 0.06 to 0.16, particularly preferably from 0.07 to 0.15. This allows both the devitrification resistance and the ion exchange performance to be achieved at high levels while the viscosity at high temperature is optimized. The term "$Na_2O+Al_2O_3$" refers to the total content of $Na_2O$ and $Al_2O_3$. The term "molar ratio $B_2O_3/(Na_2O+Al_2O_3)$" refers to a value obtained by dividing the content of $B_2O_3$ by the total content of $Na_2O$ and $Al_2O_3$.

$Li_2O$ is an ion exchange component and is a component that lowers the viscosity at high temperature to increase the meltability and the formability, and increases the Young's modulus. Further, $Li_2O$ has a great effect of increasing the compressive stress value among alkali metal oxides, but when the content of $Li_2O$ becomes extremely large in a glass system containing $Na_2O$ at 7% or more, the compressive stress value tends to lower contrarily. In addition, when the content of $Li_2O$ is too large, the liquidus viscosity lowers, easily resulting in the devitrification of the glass, and the thermal expansion coefficient becomes too high, with the result that the thermal shock resistance lowers and it becomes difficult to match the thermal expansion coefficient with those of peripheral materials. Further, viscosity at low temperature becomes too low, and stress relaxation is liable to occur, with the result that the compressive stress value lowers contrarily in some cases. Thus, a suitable upper limit range of the content of $Li_2O$ is 2% or less, 1.7% or less, 1.5% or less, 1% or less, less than 1.0%, 0.5% or less, 0.3% or less, 0.2% or less, particularly 0.1% or less. When $Li_2O$ is added, a suitable addition amount thereof is 0.005% or more, 0.01% or more, particularly 0.05% or more.

$K_2O$ is a component that promotes ion exchange and is a component that allows the depth of layer to be easily enlarged among alkali metal oxides. $K_2O$ is also a component that lowers the viscosity at high temperature to increase the meltability and the formability. Further, $K_2O$ is also a component that improves the devitrification resistance. However, when the content of $K_2O$ is too large, the thermal expansion coefficient becomes too high, the thermal shock resistance lowers, and it becomes difficult to match the thermal expansion coefficient with those of peripheral materials. In addition, the strain point lowers excessively, and the glass composition loses its component balance, with the result that the devitrification resistance tends to lower contrarily. Thus, a suitable upper limit range of the content of $K_2O$ is 10% or less, 9% or less, 8% or less, 7% or less, 6% or less, 5% or less, 4% or less, 3% or less, 2.5% or less, particularly less than 2%. When $K_2O$ is added, a suitable addition amount thereof is 0.1% or more, 0.5% or more, particularly 1% or more. In addition, when the addition of $K_2O$ is avoided as much as possible, the addition amount thereof is preferably from 0% to 1.9%, from 0% to 1.35%, from 0% to 1%, or from 0% to less than 1%, particularly preferably from 0% to 0.05%.

When the content of $Li_2O+Na_2O+K_2O$ is excessively low, the ion exchange performance and the meltability are liable to lower. Meanwhile, when the content of $Li_2O+Na_2O+K_2O$ is excessively high, there is a tendency that the thermal expansion coefficient increases excessively, with the result that the thermal shock resistance lowers, it becomes difficult to match the thermal expansion coefficient with those of peripheral materials, and the density increases. There is also a tendency that the strain point lowers excessively and the glass composition loses its component balance, with the result that the devitrification resistance lowers contrarily. Thus, a suitable lower limit range of the content of $Li_2O+Na_2O+K_2O$ is 5% or more, 6% or more, 7% or more, 8% or more, 9% or more, 10% or more, 11% or more, particularly 12% or more, and a suitable upper limit range thereof is 30% or less, 25% or less, 20% or less, 19% or less, 18.5% or less, 17.5% or less, 16% or less, 15.5% or less, 15% or less, 14.5% or less, particularly 14% or less. The term "content of $Li_2O+Na_2O+K_2O$" refers to the total content of $Li_2O$, $Na_2O$, and $K_2O$.

MgO is a component that reduces the viscosity at high temperature to enhance the meltability and the formability, and increases the strain point and the Young's modulus, and is a component that has a great effect of enhancing the ion exchange performance among alkaline earth metal oxides. Thus, a suitable lower limit range of the content of MgO is 0% or more, 0.5% or more, 1% or more, 1.5% or more, 2% or more, 2.5% or more, 3% or more, 4% or more, particularly 4.5% or more. However, when the content of MgO is too large, the density and the thermal expansion coefficient are liable to increase, and the devitrification of the glass tends to occur easily. In particular, when the glass sheet is formed by the overflow down-draw method through the use of an alumina forming body, a devitrified crystal of spinel is liable to be deposited at an interface between the glass and the alumina forming body. Thus, a suitable upper limit range of the content of MgO is 10% or less, 9% or less, 8% or less, 7% or less, 6% or less, particularly 5% or less.

CaO has greater effects of reducing the viscosity at high temperature to enhance the meltability and the formability, and increasing the strain point and the Young's modulus without involving a reduction in devitrification resistance as compared to other components. However, when the content of CaO is too large, there is a tendency that the density and the thermal expansion coefficient increase, and the glass composition loses its component balance, with the result that the glass is liable to devitrify contrarily, the ion exchange performance lowers, and the deterioration of a molten salt is liable to occur. Thus, the content of CaO is preferably from 0% to 6%, from 0% to 5%, from 0% to 4%, from 0% to 3.5%, from 0% to 3%, from 0% to 2%, or from 0% to 1%, particularly preferably from 0% to 0.5%.

SrO is a component that reduces the viscosity at high temperature to enhance the meltability and the formability, and increases the strain point and the Young's modulus. However, when the content of SrO is too large, an ion exchange reaction is liable to be inhibited, and moreover, the density and the thermal expansion coefficient increase, and the devitrification of the glass is liable to occur. Thus, the content of SrO is preferably from 0% to 1.5%, from 0% to 1%, from 0% to 0.5%, or from 0% to 0.1%, particularly preferably from 0% to less than 0.1%.

BaO is a component that reduces the viscosity at high temperature to enhance the meltability and the formability, and increases the strain point and the Young's modulus. However, when the content of BaO is too large, the ion exchange reaction is liable to be inhibited, and moreover, the density and the thermal expansion coefficient increase, and the devitrification of the glass is liable to occur. Thus, the content of BaO is preferably from 0% to 6%, from 0% to 3%, from 0% to 1.5%, from 0% to 1%, from 0% to 0.5%, or from 0% to 0.1%, particularly preferably from 0% to less than 0.1%.

When the content of MgO+CaO+SrO+BaO is excessively high, there is a tendency that the density and the thermal expansion coefficient increase, the glass devitrifies, and the ion exchange performance lowers. Thus, the content of MgO+CaO+SrO+BaO is preferably from 0% to 9.9%, from 0% to 8%, from 0% to 7%, from 0% to 6.5%, from 0% to 6%, or from 0% to 5.5%, particularly preferably from 0% to 5%. The term "content of MgO+CaO+SrO+BaO" refers to the total content of MgO, CaO, SrO, and BaO.

When the content of $Li_2O+Na_2O+K_2O+MgO+CaO+SrO+BaO$ is excessively low, the meltability is liable to lower. Thus, a suitable lower limit range of the content of $Li_2O+Na_2O+K_2O+MgO+CaO+SrO+BaO$ is 10% or more, 12% or more, 13% or more, 14% or more, 15% or more, 15.5% or more, 16% or more, 17% or more, particularly 17.5% or more. Meanwhile, when the content of $Li_2O+Na_2O+K_2O+MgO+CaO+SrO+BaO$ is excessively high, there is a tendency that the density and the thermal expansion coefficient increase, and the ion exchange performance lowers. Thus, a suitable upper limit range of the content of $Li_2O+Na_2O+K_2O+MgO+CaO+SrO+BaO$ is 30% or less, 28% or less, 25% or less, 24% or less, 23% or less, 22% or less, 21% or less, particularly 20% or less. The term "content of $Li_2O+Na_2O+K_2O+MgO+CaO+SrO+BaO$" refers to the total content of $Li_2O$, $Na_2O$, $K_2O$, MgO, CaO, SrO, and BaO.

When a molar ratio $B_2O_3/(B_2O_3+Li_2O+Na_2O+K_2O+MgO+CaO+SrO+BaO)$ reduces, the crack resistance is liable to lower, and the density and the thermal expansion coefficient are liable to increase. Meanwhile, when the molar ratio $B_2O_3/(B_2O_3+Li_2O+Na_2O+K_2O+MgO+CaO+SrO+BaO)$ increases, the devitrification resistance is liable to lower, the glass is liable to undergo phase separation, and the ion exchange performance is liable to lower. Thus, a suitable range of the molar ratio $B_2O_3/(B_2O_3+Li_2O+Na_2O+K_2O+MgO+CaO+SrO+BaO)$ is from 0.001 to 0.5, from 0.005 to 0.45, from 0.01 to 0.4, from 0.03 to 0.35, particularly from 0.06 to 0.35. The term "$B_2O_3+Li_2O+Na_2O+K_2O+MgO+CaO+SrO+BaO$" refers to the total content of $B_2O_3$, $Li_2O$, $Na_2O$, $K_2O$, MgO, CaO, SrO, and BaO.

$TiO_2$ is a component that enhances the ion exchange performance, and is also a component that reduces the viscosity at high temperature. However, when the content of $TiO_2$ is too large, the glass is liable to be colored and to devitrify. Thus, the content of $TiO_2$ is preferably from 0% to 4.5%, from 0% to 1%, from 0% to 0.5%, from 0% to 0.3%, from 0% to 0.1%, or from 0% to 0.05%, particularly preferably from 0% to 0.01%.

$ZrO_2$ is a component that remarkably enhances the ion exchange performance, and is also a component that increases the viscosity of glass around the liquidus viscosity and the strain point. Thus, a suitable lower limit range of the content of $ZrO_2$ is 0.001% or more, 0.005% or more, 0.01% or more, particularly 0.05% or more. However, when the content of $ZrO_2$ is too large, there is a risk in that the devitrification resistance may lower markedly and the crack resistance may lower, and there is also a risk in that the density may increase excessively. Thus, a suitable upper limit range of the content of $ZrO_2$ is 5% or less, 4% or less, 3% or less, 2% or less, 1% or less, 0.5% or less, 0.3% or less, particularly 0.1% or less.

ZnO is a component that enhances the ion exchange performance and is a component that has a great effect of increasing the compressive stress value, in particular. In addition, ZnO is a component that reduces the viscosity at high temperature without reducing the viscosity at low temperature. However, when the content of ZnO is too large, there is a tendency that the glass undergoes phase separation, the devitrification resistance lowers, the density increases, and the depth of layer decreases. Thus, the content of ZnO is preferably from 0% to 6%, from 0% to 5%, or from 0% to 3%, particularly preferably from 0% to 1%.

$P_2O_5$ is a component that enhances the ion exchange performance and is a component that increases the depth of layer, in particular. However, when the content of $P_2O_5$ is too large, the glass undergoes phase separation, and the water resistance is liable to lower. Thus, the content of $P_2O_5$ is preferably from 0% to 10% or from 0% to 8%, particularly preferably from 0.01% to 0.7%.

As a fining agent, one kind or two or more kinds selected from the group consisting of Cl, $SO_3$, and $CeO_2$ (preferably the group consisting of Cl and $SO_3$) may be added at from 0% to 3%.

$SnO_2$ has an effect of enhancing the ion exchange performance. Thus, the content of $SnO_2$ is preferably from 0% to 3%, from 0.01% to 3%, from 0.05% to 3%, particularly from 0.1% to 3%, particularly preferably from 0.2% to 3%.

The content of $SnO_2+SO_3+Cl$ is preferably from 0.01% to 3%, from 0.05% to 3%, or from 0.1% to 3%, particularly preferably from 0.2% to 3% from the viewpoint of simultaneously achieving a fining effect and an effect of enhancing the ion exchange performance. The term "content of $SnO_2+SO_3+Cl$" refers to the total content of $SnO_2$, Cl, and $SO_3$.

The content of $Fe_2O_3$ is preferably less than 1,000 ppm (less than 0.1%), less than 800 ppm, less than 600 ppm, or less than 400 ppm, particularly preferably less than 300 ppm. Further, a molar ratio $Fe_2O_3/(Fe_2O_3+SnO_2)$ is controlled to preferably 0.8 or more or 0.9 or more, particularly preferably 0.95 or more, while the content of $Fe_2O_3$ is controlled in the above-mentioned range. With this, the transmittance (400 nm to 770 nm) of glass having a thickness of 1 mm is easily improved (for example, 90% or more).

A rare earth oxide, such as $Nb_2O_5$ or $La_2O_3$, is a component that enhances the Young's modulus. However, the cost of the raw material itself is high, and when the rare earth oxide is added in a large amount, the devitrification resistance is liable to lower. Thus, the content of the rare earth oxide is preferably 3% or less, 2% or less, 1% or less, or 0.5% or less, particularly preferably 0.1% or less.

In addition, it is preferred that the glass to be tempered be substantially free of $As_2O_3$, $Sb_2O_3$, and PbO as a glass composition from the standpoint of environmental considerations. In addition, it is also preferred that the glass to be tempered be substantially free of $Bi_2O_3$ and F from the standpoint of environmental considerations.

The composition of the glass to be tempered described above is an example, and a glass to be tempered having a known composition may be used as long as the glass can be chemically tempered by ion exchange.

The glass to be tempered may be produced as described below.

First, glass raw materials, which have been blended so as to have the above-mentioned glass composition, are loaded in a continuous melting furnace, are melted by heating at from 1,500° C. to 1,600° C., and are fined. After that, the resultant is fed to a forming apparatus, is formed into, for example, a sheet shape, and is annealed. Thus, the glass to be tempered can be produced.

An overflow down-draw method is preferably adopted as a method of forming the glass sheet. The overflow down-draw method is a method by which a high-quality glass sheet can be produced in a large amount, and by which even a large-size glass sheet can be easily produced. In addition, the method allows scratches on the surface of the glass sheet to be reduced to the extent possible. In the overflow down-draw method, alumina or dense zircon is used as a forming body. The glass to be tempered according to the present invention has satisfactory compatibility with alumina or dense zircon, in particular, alumina (hardly produces bubbles, stones, and the like through a reaction with the forming body).

Various forming methods other than the overflow down-draw method may also be adopted. For example, forming methods such as a float method, a down draw method (such as a slot down method or a re-draw method), a roll out method, and a press method may be adopted.

Bending processing may be performed as required after the forming of the glass to be tempered, or simultaneously with the forming. In addition, processing such as cutting processing, boring processing, surface polishing processing, chamfering processing, end surface polishing processing, or etching processing may be performed as required.

The thickness of the glass to be tempered is preferably 2.0 mm or less, 1.5 mm or less, 1.3 mm or less, 1.1 mm or less, 1.0 mm or less, 0.8 mm or less, 0.7 mm or less, 0.55 mm or less, 0.5 mm or less, 0.45 mm or less, 0.4 mm or less, or 0.35 mm or less, particularly preferably 0.30 mm or less, while the dimensions of the glass to be tempered may be arbitrarily determined. Meanwhile, when the sheet thickness is excessively small, desired mechanical strength is difficult to obtain. Thus, the sheet thickness is preferably 0.05 mm or more, 0.10 mm or more, or 0.15 mm or more, particularly preferably 0.10 mm or more.

The glass to be tempered obtained as described above is subjected to the ion exchange treatment a plurality of times. In this embodiment, description is given by taking a case in which the ion exchange treatment is performed twice as an example. Specifically, the second tempering step is performed after the first tempering step.

In the first tempering step, the ion exchange treatment of the surface of the glass to be tempered is performed by: immersing the glass to be tempered in a tank filled with the first molten salt; and holding the glass to be tempered at a predetermined temperature for a predetermined time.

The first molten salt comprises, as a main component, a mixed salt of: the nitrate of an alkali metal ion (desorbed ion) that is incorporated in advance into the composition of the glass to be tempered, and that is desorbed in the ion exchange; and the nitrate of an alkali metal ion (introduced ion) introduced into the glass to be tempered by the ion exchange. In this embodiment, a case in which the desorbed ion is a sodium ion and the introduced ion is a potassium ion is described. That is, in this embodiment, the first molten salt is a mixed salt comprising $NaNO_3$ and $KNO_3$ as main components.

The concentration of the desorbed ion in the first molten salt is 18,500 ppm or more. The concentration of the desorbed ion in the first molten salt is preferably 19,000 ppm or more, more preferably from 22,000 ppm to 30,000 ppm. The use of such first molten salt facilitates the formation of the stress-neutral layer 4 having a sufficient depth.

The temperature of the first molten salt (first tempering temperature) in the ion exchange treatment of the first tempering step is preferably a temperature higher than the temperature of the second molten salt (second tempering temperature) in the ion exchange treatment of the second tempering step. Specifically, an ion exchange treatment temperature in the first tempering step is preferably 420° C. or more, more preferably 430° C. or more, still more preferably from 440° C. to 500° C.

An ion exchange treatment time (first tempering time) in the first tempering step is 3 or more times, preferably 5 or more times, more preferably from 10 times to 200 times as long as an ion exchange treatment time (second tempering time) in the second tempering step. The first tempering time is preferably 2 hours or more, more preferably from 10 hours to 200 hours. When the ion exchange treatment time in the first tempering step is lengthened, the stress-neutral layer 4 can be formed so as to be deep. Accordingly, the treatment time is preferably lengthened to the extent that the productivity of the chemically tempered glass does not reduce.

The glass to be tempered that is immersed in the first molten salt in the first tempering step may be preheated to the first tempering temperature in advance, or may be immersed in the first molten salt while being in a normal temperature state. In the present invention, normal temperature refers to a temperature of from 1° C. to 40° C.

The glass to be tempered after the completion of the treatment of the first tempering step (hereinafter referred to as "primary tempered glass") is drawn out of the first molten salt, and is subjected to the treatment of the second tempering step. At this time, the primary tempered glass is preferably washed in a washing step in advance before being subjected to the treatment of the second tempering step. When the washing is performed, it becomes easier to remove a deposit adhering to the primary tempered glass, and hence the ion exchange treatment can be more uniformly performed in the second tempering step.

In the second tempering step, the surface of the primary tempered glass is further subjected to ion exchange treatment by immersing the primary tempered glass in a tank filled with the second molten salt.

The concentration of the desorbed ion in the second molten salt is less than the concentration of the desorbed ion in the first molten salt. That is, in this embodiment, the sodium ion concentration of the second molten salt is adjusted so as to be smaller than the sodium ion concentration of the first molten salt. Specifically, the concentration of the desorbed ion in the second molten salt is preferably less than 3,000 ppm, more preferably less than 800 ppm, still more preferably from 500 ppm to 1 ppm. For example, a molten salt formed of 100 mass % of $KNO_3$ may be used as the second molten salt.

In addition, the concentration of the introduced ion in the second molten salt is preferably adjusted so as to be larger than the concentration of the introduced ion in the first molten salt. That is, in this embodiment, the concentration of the potassium ion in the second molten salt is preferably set to be larger than the concentration of the potassium ion in the first molten salt.

In addition, the content ratio of an alkali metal ion having a small ionic radius (e.g., a Li ion or a Na ion, in particular, a Na ion) in the second molten salt is preferably smaller than that in the first molten salt. With this, it becomes easier to increase the concentration of a large alkali metal ion in the outermost surface while increasing the depth of layer. The sizes of alkali metal ions satisfy the following relationship: Li ion<Na ion<K ion (potassium ion)<Ce ion<Rb ion.

When the second molten salt is formed as described above, the compressive stress layer 2 that is high can be formed near the surface of the chemically tempered glass.

An ion exchange temperature in the second tempering step is lower than the ion exchange temperature in the first tempering step by preferably 10° C. or more, 20° C. or more, or 30° C. or more, particularly preferably 50° C. or more. Specifically, the ion exchange temperature in the second tempering step is preferably from 350° C. to less than 410° C., particularly preferably from 360° C. to less than 400° C.

The ion exchange treatment time of the second tempering step is relatively shorter than the ion exchange treatment time of the first tempering step. The ion exchange treatment time of the second tempering step is set to be preferably 20 hours or less, more preferably from 0.5 hour to 15 hours. When the total time of the ion exchange treatments is controlled to be short, the tensile stress in the tensile stress layer 3 is easily controlled to a small value.

The chemically tempered glass 1 of the present invention having the above-mentioned characteristics is obtained by appropriately adjusting the treatment times and the treatment temperatures in the condition ranges of the first tempering step and the second tempering step described above.

After the second tempering step, various kinds of processing, such as cutting processing, boring processing, surface polishing processing, chamfering processing, end surface polishing processing, etching processing, and film formation processing, may each be performed.

In addition, in the above-mentioned embodiment, an example in which the two tempering treatments, that is, the first tempering step and the second tempering step are performed has been described. However, three or more tempering treatments may be performed.

In addition, in the above-mentioned embodiment, a case in which the sodium ion in the glass is subjected as the desorbed ion to the ion exchange has been given as an example. However, the present invention may also be applied to the ion exchange of any other ion. For example, the desorbed ion may be a lithium ion, and the introduced ion may be a sodium ion and/or a potassium ion. In particular, when the glass to be tempered contains 2% or more of $Li_2O$ in terms of mol %, a mixed salt of $LiNO_3$, and $NaNO_3$ and/or $KNO_3$ may be used as the first molten salt.

EXAMPLES

The tempered glass according to the present invention is hereinafter described based on Examples. The following Examples are merely illustrative. The present invention is by no means limited to these Examples.

A sample was produced as described below. First, glass raw materials were blended so as to comprise as a glass composition, in terms of mol %, 65.5% of $SiO_2$, 15.4% of $Al_2O_3$, 16.4% of $Na_2O$, 2.6% of MgO, and 0.1% of $SnO_2$, and were melted with a platinum pot at 1,600° C. for 21 hours. After that, the resultant molten glass was subjected to flow-down forming from a refractory forming body by using an overflow down-draw method to be formed into a sheet shape having a thickness of 0.8 mm.

Next, the glass to be tempered was subjected to ion exchange treatment under conditions shown in Table 1 to provide sheet-shaped tempered glasses (samples Nos. 1 to 6). The samples Nos. 1 to 5 were each subjected to two tempering treatments, that is, a first tempering step and a second tempering step, and the sample No. 6 was subjected only to one tempering treatment, that is, the first tempering step. The samples Nos. 1 and 2 correspond to Examples of the present invention, and the samples Nos. 3 to 6 correspond to Comparative Examples.

Various characteristics of the tempered glasses thus obtained, which were measured as described below, are shown in Table 1, and the strength test results thereof are shown in FIG. 4 to FIG. 9. In Table 1, a Na ion concentration (desorbed ion concentration) is an ion concentration at the time of the start of each tempering step.

TABLE 1

| No. | Unit | 1 | 2 | 3 | 4 | 5 | 6 |
|---|---|---|---|---|---|---|---|
| Sheet thickness T | mm | 0.8 | 0.8 | 0.8 | 0.8 | 0.8 | 0.8 |
| First tempering step — First tempering temperature | ° C. | 470 | 470 | 470 | 450 | 470 | 430 |
| First tempering step — First tempering time | hr | 175 | 112 | 67 | 49 | 23 | 2.75 |
| First tempering step — Na ion concentration | ppm | 250,000 | 200,000 | 180,000 | 150,000 | 110,000 | 0 |
| Second tempering step — Second tempering temperature | ° C. | 390 | 390 | 390 | 390 | 390 | — |
| Second tempering step — Second tempering time | hr | 1 | 1 | 1 | 1 | 1 | — |
| Second tempering step — Na ion concentration | ppm | 0 | 0 | 0 | 0 | 0 | — |
| MaxCS | MPa | 1,421 | 1,408 | 1,390 | 1,418 | 1,414 | 1,433 |
| MaxCT | MPa | 33 | 50 | 49 | 49 | 56 | 46 |
| Stress-neutral layer starting point DCtw | μm | 19 | 89 | 85 | 69 | 67 | 26 |
| Stress-neutral layer ending point DTtw | μm | 190 | 153 | 126 | 94 | 83 | 28 |
| Stress-neutral layer thickness ΔDtw (=DTtw − DCtw) | μm | 171 | 64 | 41 | 25 | 16 | 2 |
| T × 0.053 | μm | 42.4 | 42.4 | 42.4 | 42.4 | 42.4 | 42.4 |
| Neutral core layer starting point DMC | μm | 33 | 97 | 90 | 67 | 69 | 26 |
| Neutral core layer ending point DMT | μm | 90 | 126 | 108 | 82 | 76 | 27 |
| ΔDM = DMT − DMC | μm | 56 | 29 | 18 | 15 | 8 | 1 |
| T × 0.025 | μm | 20 | 20 | 20 | 20 | 20 | 20 |
| Compressive stress change amount A1 | MPa/μm | −205 | −163 | −151 | −138 | −129 | −61 |
| Compressive stress change amount A2 | MPa/μm | −0.238 | −0.713 | −1.034 | −0.979 | −1.006 | 0 |
| A1/A2 | — | 862 | 229 | 146 | 141 | 128 | — |
| DOL_zero | μm | 77.5 | 117.5 | 102.4 | 79.3 | 73.7 | 27.1 |
| Tensile stress change amount B | MPa/μm | −0.27 | −0.61 | −0.91 | −1.39 | −2 | −1.46 |
| Drop breaking height P100 | cm | 33 | 37 | 20 | 20 | 20 | 20 |

FIG. 4 to FIG. 9 are graphs for showing the stress distributions of the samples Nos. 1 to 6 in their sheet thickness directions, respectively. In each of FIG. 4 to FIG. 9, an axis of abscissa indicates a depth (μm) from one main surface, and an axis of ordinate indicates the magnitude of a stress (MPa). In each of FIG. 4 to FIG. 9, a compressive stress is represented by a positive value and a tensile stress is represented by a negative value, and the magnitude of each stress is represented by its absolute value. In each of FIG. 4 to FIG. 9, a distribution from the one main surface to a depth of 300 μm is shown. The stress distributions of FIG. 4 to FIG. 9 were measured with a surface stress meter FSM-6000LE and application software FsmV manufactured by Orihara Manufacturing Co., Ltd. At the time of the measurement, the refractive index and optical elastic constant of a sample were set to 1.50 and 29.5 [(nm/cm)/MPa], respectively.

The following characteristics shown in Table 1 were measured and calculated on the basis of the stress distributions.

In Table 1, MaxCS represents the maximum compressive stress value in the compressive stress layer 2. MaxCT represents the maximum tensile stress value of the tensile stress layer 3.

DCtw represents a depth from the main surface to the position at which the compressive stress becomes 20 MPa. That is, the DCtw represents the end position of the compressive stress layer 2 in the present invention. DTtw represents a depth from the main surface to the position at which the tensile stress becomes 20 MPa. That is, the DTtw represents the start position of the tensile stress layer 3 in the present invention. As described in the foregoing, ΔDtw represents the thickness of a layer having a compressive stress of less than 20 MPa and/or a tensile stress of less than 20 MPa. The ΔDtw is determined from a difference between the DTtw and the DCtw.

DMC represents a depth from the main surface to the position at which the compressive stress becomes 0.01 times as large as the MaxCS. DMT represents a depth from the main surface to the position at which the tensile stress becomes 0.1 times as large as the MaxCT. ΔDM represents the thickness of a layer continuously having a compressive stress 0.01 or less times as large as the MaxCS and/or a tensile stress 0.1 or less times as large as the MaxCT. The ΔDM is determined from a difference between the DMT and the DMC.

A1 represents a stress change amount per unit depth in the compressive stress layer 2. A2 represents a stress change amount per unit depth in the layer having a compressive stress of less than 20 MPa and/or a tensile stress of less than 20 MPa (in each of Examples, the stress-neutral layer 4). The stress change amounts A1 and A2 per unit depth may each be determined, for example, as follows: in a graph for showing a stress and a stress change in a depth direction like FIG. 4 to FIG. 9, the portion of the corresponding layer is linearly approximated by using the least-squares method, and the slope of the resultant straight line is adopted as the change amount.

A drop breaking height represents the height at which, when a glass sample is bonded to a simulated casing imitating a personal digital assistant, and the resultant is dropped onto sandpaper, the glass sample breaks. Specifically, first, each glass sample is processed into a size measuring 65 mm wide by 130 mm long by 0.8 mm thick, and is bonded to the simulated casing. The simulated casing is a polycarbonate-made thick sheet member measuring 70 mm wide by 140 mm long by 8 mm thick, and having a mass of 110 g. The test body thus obtained was held in a horizontal posture so that its glass surface was directed downward, and the test body was repeatedly dropped toward a drop surface having arranged thereon sandpaper while a drop height was raised until the glass sample broke. In more detail, in the present application, a test was performed by: clamping the test body with a clamping part formed of an air cylinder; starting the dropping of the test body together with the clamping part; and releasing the clamping with the air cylinder at a position 20 cm above the drop surface to drop the test body toward the drop surface while causing the test body to maintain the horizontal posture. SiC SANDPAPER P100 manufactured by Riken Corundum Co., Ltd. was used as the sandpaper, and was replaced with a new one every time one drop test was performed. The drop height was set as follows: the drop height was measured with respect to a height of 20 cm from the drop surface, and when the glass sample did not break, the drop height was raised by 10 cm.

The ΔDtw of each of the samples of Examples was sufficiently large. Accordingly, each of the samples had a high drop breaking strength, and hence had high impact resistance.

INDUSTRIAL APPLICABILITY

The chemically tempered glass of the present invention may be utilized as a part for, for example, a cellular phone (in particular, a smartphone), a digital camera, a PDA, a touch panel display, or a large-screen television.

REFERENCE SIGNS LIST 1 chemically tempered glass
2 compressive stress layer
3 tensile stress layer
4 stress-neutral layer
5 neutral core layer

The invention claimed is:

1. A chemically tempered glass, comprising:
    a compressive stress layer having a compressive stress of 20 MPa or more continuously from a main surface in a depth direction thereof;
    a tensile stress layer that is arranged on an inner side with respect to the compressive stress layer in a sheet thickness direction and has a tensile stress of 20 MPa or more continuously in a depth direction thereof; and
    a stress-neutral layer arranged between the compressive stress layer and the tensile stress layer,
    wherein the stress-neutral layer
        has a compressive stress of less than 20 MPa and/or a tensile stress of less than 20 MPa continuously in the sheet thickness direction, and
        has a thickness of 5.3% or more of a sheet thickness, and
    wherein the chemically tempered glass is prepared by a process comprising:
        (1) immersing a glass to be tempered containing an alkali metal as a composition in a first molten salt to subject the glass to a first ion exchange treatment; and
        (2) immersing the glass in a second molten salt to subject the glass to a second ion exchange treatment to provide the chemically tempered glass,
        wherein a treatment time of the first ion exchange treatment is 3 or more times as long as a treatment time of the second ion exchange treatment, and the treatment time of the first ion exchange treatment is 112 hours or more.

2. The chemically tempered glass according to claim 1, wherein the stress-neutral layer further comprises a neutral core layer that continuously has a compressive stress 0.01 or less times as large as a maximum compressive stress value of the compressive stress layer and/or a tensile stress 0.1 or less times as large as a maximum tensile stress value of the tensile stress layer, and that has a thickness of 2.5% or more of the sheet thickness.

3. The chemically tempered glass according to claim 1, wherein the thickness of the stress-neutral layer is 25% or less of the sheet thickness.

4. The chemically tempered glass according to claim 1, wherein the stress-neutral layer extends from a position equal to or shallower than 8% of the sheet thickness toward a center of the sheet thickness.

5. The chemically tempered glass according to claim 1, wherein the tensile stress layer extends from a position equal to or deeper than 19% of the sheet thickness with respect to the main surface toward a region including a central portion of the sheet thickness.

6. The chemically tempered glass according to claim 1,
    wherein the chemically tempered glass has a thickness of 1.0 mm or less,
    wherein the compressive stress layer has a maximum compressive stress of 600 MPa or more, and
    wherein the tensile stress layer has a maximum tensile stress of from 20 MPa to 72 MPa.

7. The chemically tempered glass according to claim 1, wherein the stress-neutral layer has a compressive stress of from 0 MPa to 20 MPa continuously over a thickness of 3% or more of a sheet thickness T.

8. The chemically tempered glass according to claim 1,
    wherein the stress-neutral layer comprises
        a low-compressive stress layer having a compressive stress, and
        a low-tensile stress layer having a tensile stress, and
    wherein the low-compressive stress layer and the low-tensile stress layer are alternately formed.

9. The chemically tempered glass according to claim 1, wherein, when a compressive stress change amount per unit depth in a case where a stress change in the compressive stress layer in the depth direction is linearly approximated by using a least-squares method is represented by A1 (Mpa/μm), and a compressive stress change amount per unit depth in a case where a stress change in the stress-neutral layer in a depth direction thereof is linearly approximated by using the least-squares method is represented by A2 (Mpa/μm), a relationship of A1/A2>210 is satisfied.

10. The chemically tempered glass according to claim 1, wherein, when a position in the depth direction between the compressive stress layer and the tensile stress layer at which a stress becomes zero is represented by DOL_zero, and a stress change amount per unit depth in a case where a tensile stress change from the position DOL_zero to a depth of DOL_zero+15 (μm) is linearly approximated by using a least-squares method is represented by B, a relationship of B≥−0.90 is satisfied.

11. The chemically tempered glass according to claim 1, wherein the chemically tempered glass comprises the compressive stress layer and the stress-neutral layer on each side of front and back main surfaces thereof.

12. The chemically tempered glass according to claim 1, wherein the chemically tempered glass comprises as a glass composition, in terms of mol %, 50% to 80% of $SiO_2$, 5% to 30% of $Al_2O_3$, 5% to 25% of $Na_2O$, 0% to 10% of $Li_2O$, and 0% to 30% of MgO.

13. The chemically tempered glass according to claim 12, wherein the chemically tempered glass further comprises as a glass composition, in terms of mol %, 0.01% to 10% of $P_2O_5$ and 0.01% to 3% of $SnO_2$.

14. A method of producing the chemically tempered glass according to claim 1, comprising:
    immersing a glass to be tempered containing an alkali metal as a composition in a first molten salt to subject the glass to first ion exchange treatment; and
    then immersing the glass in a second molten salt to subject the glass to second ion exchange treatment to provide the chemically tempered glass,
    wherein the first molten salt comprises a molten salt containing 18,500 ppm or more of a desorbed ion desorbed from the glass in the first ion exchange treatment, wherein a concentration of the desorbed ion in the second molten salt is less than a concentration of the desorbed ion in the first molten salt, and wherein a treatment time of the first ion exchange treatment is 3 or more times as long as a treatment time of the second ion exchange treatment.

15. The method of producing the chemically tempered glass according to claim 14, wherein the desorbed ion comprises a sodium ion, and wherein the concentration of the desorbed ion in the second molten salt is less than 1,000 ppm.

* * * * *